E. A. BALDWIN.

DRIVE CHAIN.

No. 11,571. Reissued Sept. 29, 1896.

WITNESSES

A. A. Pomeroy.

C. G. Grayson

INVENTOR

Ellery A. Baldwin,

By his Atty.

Henry C. Williams

UNITED STATES PATENT OFFICE.

ELLORY A. BALDWIN, OF UPTON, MASSACHUSETTS, ASSIGNOR TO ANNA J. CUTLER, OF FRAMINGHAM, MASSACHUSETTS.

DRIVE-CHAIN.

SPECIFICATION forming part of Reissued Letters Patent No. 11,571, dated September 29, 1896.

Original No. 523,877, dated July 31, 1894. Application for Reissue filed May 28, 1896. Serial No. 593,522.

*To all whom it may concern:*

Be it known that I, ELLORY A. BALDWIN, a citizen of the United States, residing at Upton, in the county of Worcester and State of Massachusetts, have invented a new and useful Improvement in Bicycle or Parallel-Link Chains, of which the following is a specification.

My improvement relates to parallel-link chains which operate in conjunction with sprocket-wheels; and the objects of my improvement are, first, to provide facilities for taking up the slack of the chain arising from wear; second, to provide a quick and simple method of attaching and detaching the several parts of the chain to and from each other so that the first object may be readily attained; and, third, to provide a method by which the bearings may be rendered noiseless and dust-proof. I attain these objects by the mechanism illustrated in the accompanying drawings, in which—

Figure 1:
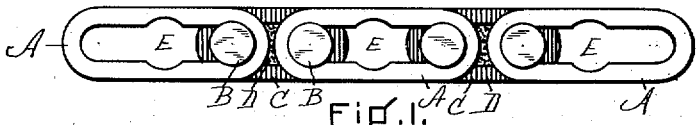
Figure 2:
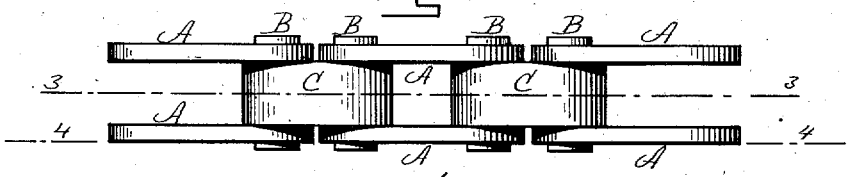
Figure 3:
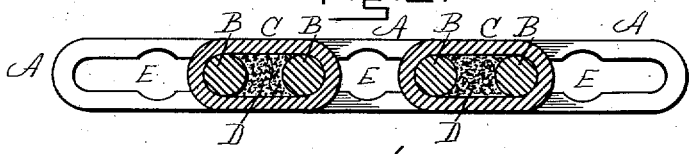
Figure 4:
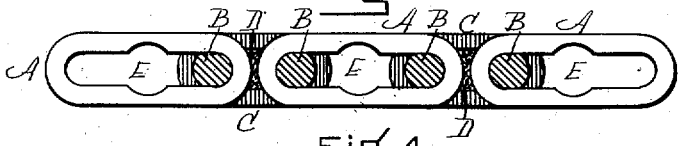
Figure 5:
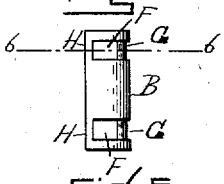
Figure 6:
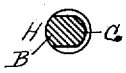
Figure 7:
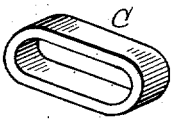
Figure 8:
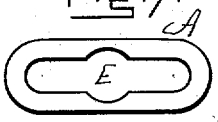

Figure 1 represents a side view of my improved chain. Fig. 2 is a top view of the same. Fig. 3 shows a longitudinal section on line 3 3, Fig. 2. Fig. 4 is a similar section on line 4 4, Fig. 2. Fig. 5 is a detailed view of the barrel-stud. Fig. 6 is a section on line 6 6, Fig. 5. Fig. 7 is a perspective view of the central strap. Fig. 8 is a detail of one of the side links.

Similar letters refer to similar parts throughout the several views.

A is a slotted parallel link.

B is the barrel-stud connecting parallel links to each other.

C C are the central straps, made from tubing flattened and hardened, packed with felt D or other substance capable of excluding dust and furnishing a noiseless and dust-proof bearing.

E is an enlargement of the slot in each parallel link sufficiently large to allow of the removal of the link over the head of the barrel-stud in order that the stud may be taken out and turned half-way over. The object and necessity of this reversal of the stud arise from the fact that as the chain wears it lengthens and thus loosens and rattles. The manner in which my invention provides for retightening the chain and taking up this slack is seen by reference to Fig. 5, in which F F are flat slots in which fit the edges of the parallel link A sufficiently close to prevent the barrel-studs B from turning while in use.

G G are rounded slots, about a thirty-second of an inch in depth, to receive the inner end of the parallel link A when the chain is first used and before slackened by wear.

When by use the chain has become slack, one or any number of the barrel-studs B may be turned half-way over so that the unslotted sides H H may bear on the inner edge of the parallel link A. Each barrel-stud thus turned shortens the chain the depth of the slot G and tightens it to that extent.

I am aware that prior to my invention parallel-link chains have been made, and I do not claim their invention broadly.

What I do claim as my invention, and desire to secure by Letters Patent, is—

1. In a parallel-link drive-chain, the combination with the pairs of links and the links intermediate of and connecting said pairs; of studs connecting said pairs of links and intermediate links and having the opposite sides of their bearing portions curved to fit the inner bearing-surfaces of the links, one of said curved bearing portions being nearer the center or axis of the stud than the other, whereby by removing the studs from their positions, turning them partly around and replacing them, the pairs of links may be drawn toward each other, thus shortening the chain, substantially as described.

2. In a parallel-link drive-chain, the combination with the pairs of links and the links intermediate of and connecting said pairs; of studs extending through said pairs and intermediate links and directly connecting the same, said studs having one side of their bearing-surfaces flush or even with the rest of the length of the stud on that side and the opposite side grooved on a curve, whereby the studs may be removed from their places, turned partially around and replaced and thus draw the links toward or from each other, shortening or lengthening the chain, substantially as set forth.

3. In a parallel-link drive-chain, the combination with the pairs of links and the links intermediate of and connecting said pairs; of the reversible studs B provided with the grooves F and G, substantially as described.

4. The combination in a parallel-link chain of the slotted links A, having the slot enlarged at E, with the reversible barrel-studs B; having grooves F, F and G, G and the central straps C, all substantially as set forth.

ELLORY A. BALDWIN.

Witnesses:
HENRY W. WILLIAMS,
A. N. BONNEY.